(12) United States Patent
Nakamura et al.

(10) Patent No.: US 9,716,806 B2
(45) Date of Patent: Jul. 25, 2017

(54) MANAGEMENT SYSTEM THAT EFFICIENTLY MANAGES IMAGE FORMING APPARATUS IN UNITS OF GROUPS, AND MANAGEMENT METHOD

(71) Applicant: KYOCERA Document Solutions Inc., Osaka (JP)

(72) Inventors: Takeshi Nakamura, Osaka (JP); Toyoaki Oku, Osaka (JP); Ryuichi Ishizu, Osaka (JP); Atsushi Matsumoto, Osaka (JP); Katsuhiro Minoru, Osaka (JP); Daisuke Yoshida, Osaka (JP); Ryosuke Mondo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/205,770

(22) Filed: Jul. 8, 2016

(65) Prior Publication Data
US 2017/0019552 A1    Jan. 19, 2017

(30) Foreign Application Priority Data
Jul. 13, 2015    (JP) ................................. 2015-139471

(51) Int. Cl.
*G06F 15/00*        (2006.01)
*H04N 1/00*         (2006.01)

(52) U.S. Cl.
CPC ....... *H04N 1/00973* (2013.01); *H04N 1/0097* (2013.01); *H04N 1/00244* (2013.01); *H04N 1/00344* (2013.01); *H04N 1/00408* (2013.01)

(58) Field of Classification Search
USPC ........................................... 358/1.15
See application file for complete search history.

(56) References Cited

U.S. PATENT DOCUMENTS

| | | | |
|---|---|---|---|
| 5,485,246 A | 1/1996 | Hayashi et al. | 355/202 |
| 5,510,876 A | 4/1996 | Hayashi et al. | 355/202 |
| 5,546,164 A | 8/1996 | Hayashi et al. | 355/204 |
| 5,694,201 A | 12/1997 | Hayashi et al. | 355/202 |
| 5,784,663 A | 7/1998 | Hayashi et al. | 399/8 |

(Continued)

FOREIGN PATENT DOCUMENTS

| | | |
|---|---|---|
| JP | 2001-250008 A | 9/2001 |
| JP | 2003-264648 A | 9/2003 |

*Primary Examiner* — Saeid Ebrahimi Dehkord
(74) *Attorney, Agent, or Firm* — Stein IP, LLC

(57) ABSTRACT

A management system includes a management server and one or more image forming apparatuses. The management server includes an operation input unit, a display, a first communication unit, a storage unit, and a manager unit. The manager unit, when the administrator instructs a set value change of a setting item for a specific image forming apparatus, determines which set value management group includes the image forming apparatus to which the change has been instructed, refers to a reflection-range table of a set value management group including the image forming apparatus to which the change has been instructed, determines which image forming apparatus among other image forming apparatuses executes the set value change based on the reference result, and instructs the other determined image forming apparatus to change the set value.

4 Claims, 10 Drawing Sheets

(56) References Cited

U.S. PATENT DOCUMENTS

2001/0018691 A1    8/2001   Sakakibara ................ 707/104.1
2006/0085472 A1*  4/2006   Nakamura ............. G06Q 10/06
2013/0083343 A1*  4/2013   Ohara ................... G06F 3/1219
                                                                      358/1.13
2014/0355067 A1* 12/2014  Asahara ................ G06F 3/1204
                                                                        358/1.15

* cited by examiner

*FIG. 6*

| Setting Item Category | Reflection Range |
|---|---|
| Print Setting Category | Individual Apparatus |
| Scanner Setting Category | Individual Apparatus |
| Energy Saving Setting Category | All Apparatuses |
| Network Setting Category | Identical Location |
| FAX Setting Category | Identical Location |
| Security Setting Category | All Apparatuses |
| User Setting Category | Identical Location |

17b

MANAGEMENT SYSTEM THAT EFFICIENTLY MANAGES IMAGE FORMING APPARATUS IN UNITS OF GROUPS, AND MANAGEMENT METHOD

INCORPORATION BY REFERENCE

This application is based upon, and claims the benefit of priority from, corresponding Japanese Patent Application No. 2015-139471 filed in the Japan Patent Office on Jul. 13, 2015, the entire contents of which are incorporated herein by reference.

BACKGROUND

Unless otherwise indicated herein, the description in this section is not prior art to the claims in this application and is not admitted to be prior art by inclusion in this section.

There has been variously contrived to manage an image forming apparatus from a remote location to manage the image forming apparatus easily.

For example, there is a typical technique in which a management device connected to a copier via a network automatically exchanges data to/from the copier via the network, so as to manage the copiers while preventing an error caused by interposition of an administrator.

There is another typical technique that acquires information on usage and a quality of a device via a network from the device located in, for example, an office of a customer. The technique uses the provided information so as to provide the customer with various benefits.

SUMMARY

A management system according to one aspect of the disclosure includes a management server and one or more image forming apparatuses. The management server includes an operation input unit, a display, a first communication unit, a storage unit, and a manager unit. The operation input unit accepts an instruction from an administrator who manages the one or more image forming apparatuses. The display displays various information for the administrator. The first communication unit communicates with the one or more image forming apparatuses. The storage unit stores a set value management group database and a reflection-range table for each set value management group. The set value management group database includes a defined set value management group for managing a set value change of a setting item for the one or more image forming apparatuses. The reflection-range table defines which image forming apparatus in the set value management group reflects the set value change to a specific image forming apparatus. The manager unit, when the administrator instructs a set value change of a setting item for the specific image forming apparatus, determines which set value management group includes the image forming apparatus to which the change has been instructed, refers to a reflection-range table of a set value management group including the image forming apparatus to which the change has been instructed, determines which image forming apparatus among other image forming apparatuses executes the set value change based on the reference result, and instructs the other determined image forming apparatus to change the set value. The image forming apparatuses each include a second communication unit and an agent unit. The second communication unit communicates with the management server. The agent unit, when the agent unit receives an instruction of a set value change of a setting item for own apparatus from the manager unit, executes the set value change of the setting item for the own apparatus based on the received instruction.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 6 illustrates an exemplary reflection-range table according to the first embodiment;

DETAILED DESCRIPTION

Figure 1:
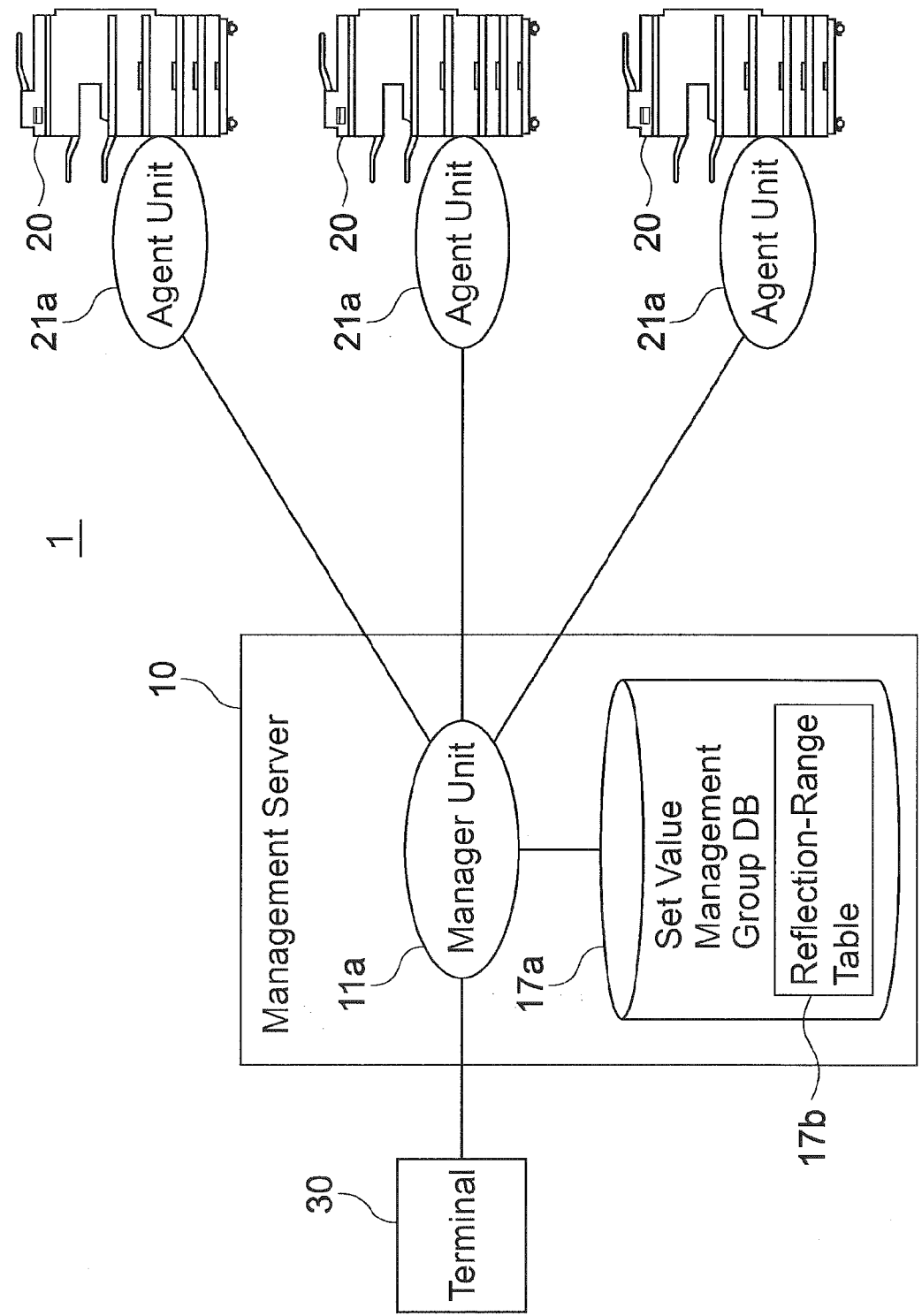
FIG. 1 illustrates a configuration of a management system according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes the embodiment of the disclosure with reference to the drawings.

First Embodiment

First, the following describes a first embodiment of the disclosure.

Outline of Management System and Overall Configuration

First, the following describes an outline and an overall configuration of a management system according to the first embodiment of the disclosure. FIG. 1 illustrates an overall configuration of a management system 1 according to the first embodiment of the disclosure.

The management system 1 includes a management server 10 and one or more image forming apparatuses 20.

The image forming apparatus 20 includes an agent unit 21a for setting or changing values of various setting items for the image forming apparatus 20.

The management server 10 includes a manager unit 11a, a set value management group database (DB) 17a (described below), and a reflection-range table 17b (described below) to set or update the set values of the various setting items for the image forming apparatus 20.

When setting or changing the set value of the image forming apparatus 20, the agent unit 21a in the image forming apparatus 20 as a target and the manager unit 11a in the management server 10 exchange information one another via a network.

The above has described the overall configuration of the management system 1.

Figure 2:
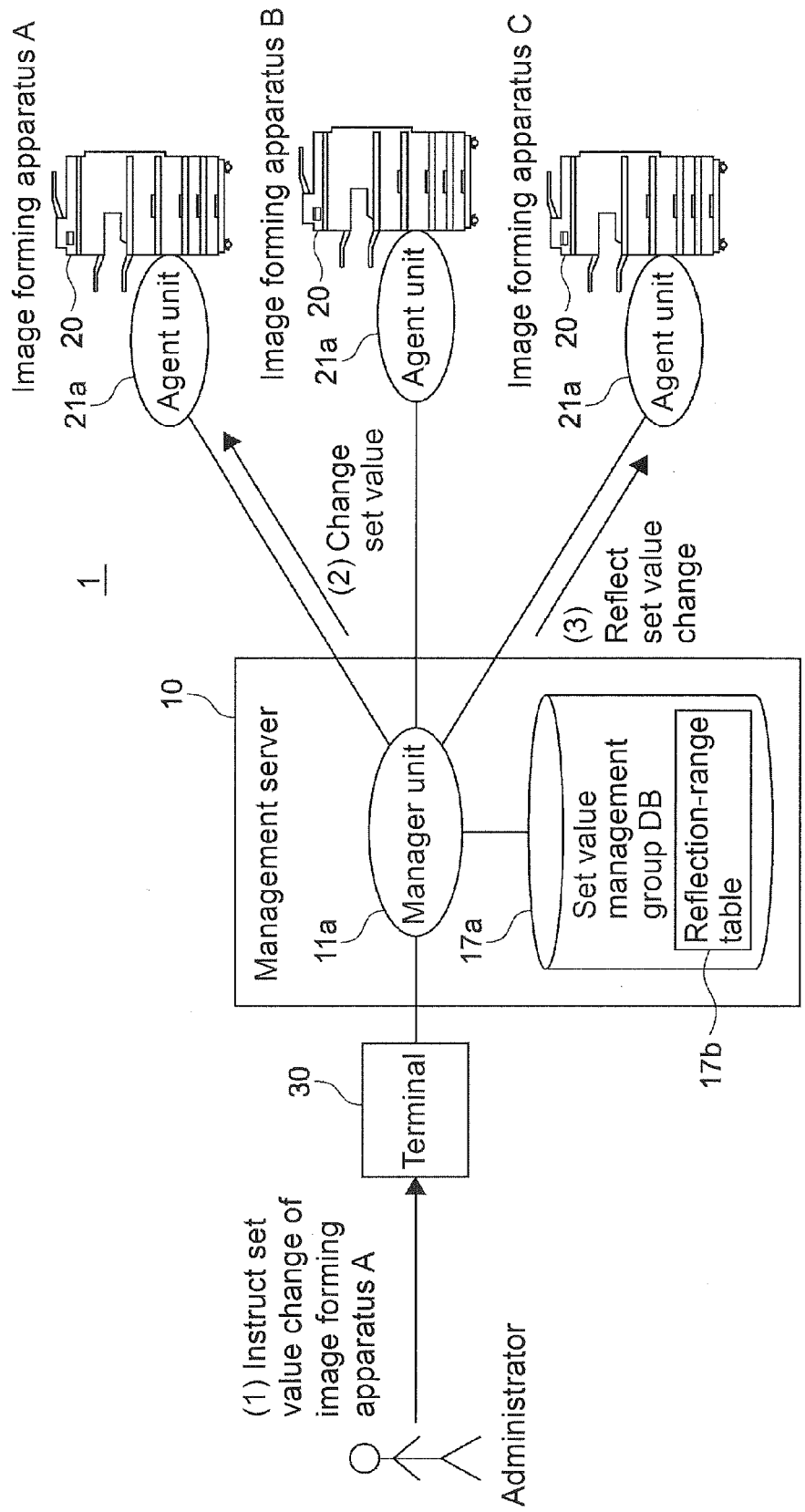
FIG. 2 illustrates the configuration and an operation outline of the management system according to the first embodiment.

Next, the following describes an operation outline of the management system 1. FIG. 2 illustrates an operation outline of the management system 1.

An administrator who sets set values of the various setting items for the image forming apparatus 20 exchanges information with the manager unit 11a in the management server 10 via the network through a terminal 30, so as to set or change the set value of the image forming apparatus 20.

(1) First, the administrator instructs the manager unit 11a in the management server 10 through the terminal 30 to change a set value of a specific image forming apparatus 20 (an image forming apparatus A illustrated in FIG. 2).

(2) Next, in response to the instruction from the manager unit 11a, a value of a specified setting item among setting items of the image forming apparatus A is changed to a specified set value.

(3) Next, the manager unit 11a determines which image forming apparatus needs the set value change, which has been executed for the image forming apparatus A, to be executed, referring to the reflection-range table 17b. Then, the manager unit 11a executes the set value change for the determined image forming apparatus. Here, assume that an image forming apparatus C is determined as an image forming apparatus where a change to the identical set value is to be reflected (without reflecting to the image forming apparatus B).

As described above, with the management system 1 according to the first embodiment of the disclosure, executing a set value change of a setting item for one image forming apparatus 20 by the administrator automatically determines another image forming apparatus 20 for which an identical change is to be reflected, and then executes the set value change for the determined other image forming apparatus 20.

This ensures the reduced labor of the administrator and reduces occurrence of omission of a set value change in the group, compared with a case where the administrator manually manages a plurality of the image forming apparatuses as a group.

A detail of the management server 10 and the image forming apparatus 20 is described later.

The above has described the overall configuration and the operation outline of the management system 1 according to the first embodiment of the disclosure.

Configuration of Management Server

Figure 3:
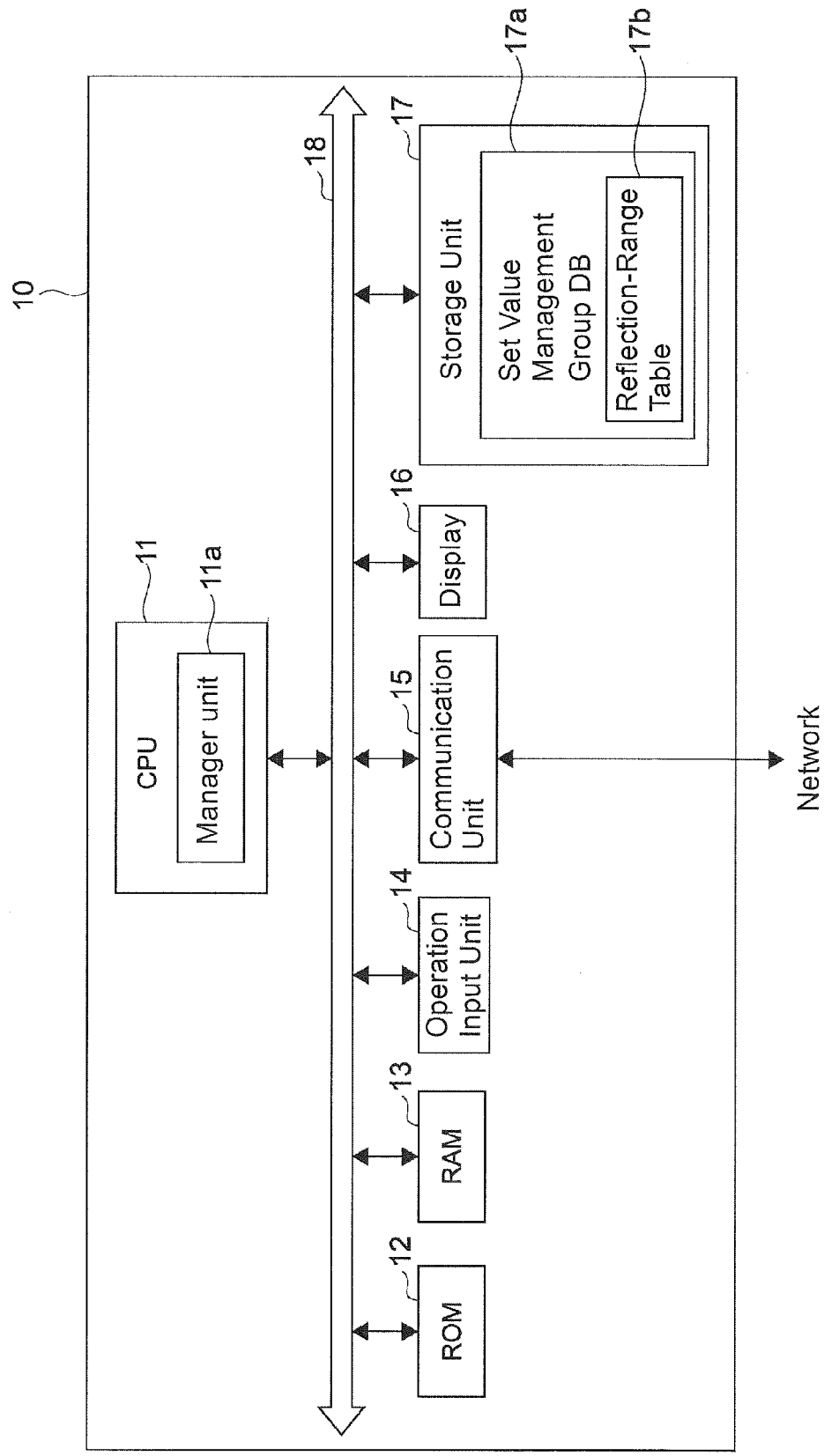
FIG. 3 illustrates a block configuration of a management server according to the first embodiment.

Next, the following describes a configuration of the management server 10. The management server 10 may be constituted of dedicated hardware or software, or may be constituted of a typical computer. FIG. 3 illustrates a configuration where a typical computer constitutes the management server 10.

As illustrated in FIG. 3, the management server 10 includes a Central Processing Unit (CPU) 11, a Read Only Memory (ROM) 12, a Random Access Memory (RAM) 13, an operation input unit 14, a communication unit 15 (a first communication unit), a display 16, and a storage unit 17. These respective blocks are connected via a bus 18.

The ROM 12 stores a plurality of programs and data, such as firmware for executing various processing. The RAM 13 is used as a working area for the CPU 11, and temporarily holds an Operating System (OS), various applications in execution, and various data in processing.

The storage unit 17 is a non-volatile memory, such as, a Hard Disk Drive (HDD), and a flash memory. The storage unit 17 stores the set value management group database 17a for managing the OS, the various applications, the various data, and a set value setting for the image forming apparatus 20 in units of groups, and the reflection-range table 17b for determining a range of the image forming apparatuses 20 where a set value change is to be reflected.

The communication unit 15 is connected to a network for exchanging information to/from the image forming apparatus 20 and the terminal 30.

The CPU 11 loads a program corresponding to an instruction received from the operation input unit 14 among the plurality of the programs stored in the ROM 12 or the storage unit 17 into the RAM 13, and appropriately controls the display 16 and the storage unit 17 in accordance with this loaded program.

The operation input unit 14 is, for example, a pointing device such as a computer mouse, a keyboard, a touch panel, and another operating device.

The display 16 is, for example, a liquid crystal display, an Electro-Luminescence (EL) display, and a plasma display.

Next, the following describes a function block, which is achieved by an execution of the program in the CPU 11.

The function block achieved by the CPU 11 in the management server 10 is the manager unit 11a.

The manager unit 11a changes the set value of the setting item for the specified image forming apparatus 20 in accordance with an instruction from the administrator, and executes the set value change for another image forming apparatus 20 after referring to the reflection-range table 17b.

A detail process of the manager unit 11a is described later.

The above has described the configuration of the management server 10.

Configuration of Image Forming Apparatus

Figure 4:
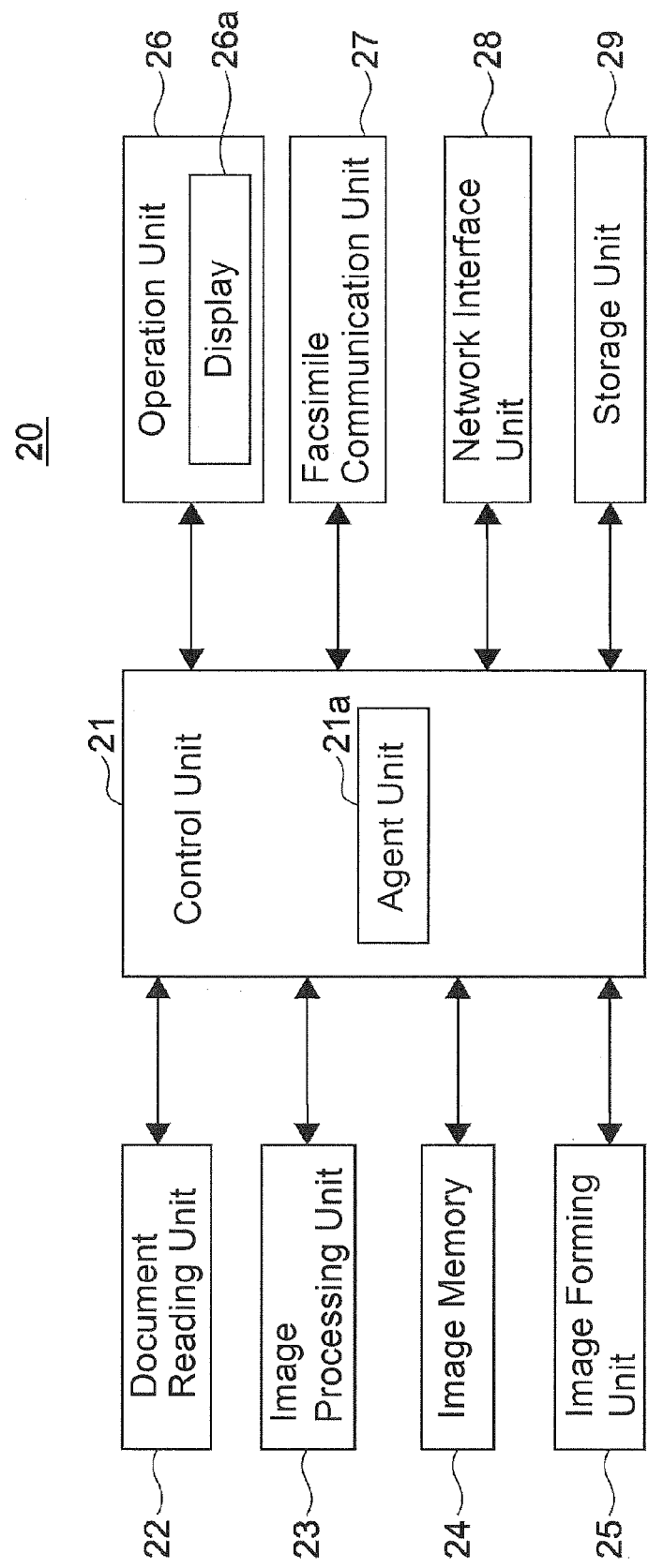
FIG. 4 schematically illustrates a block configuration of an image forming apparatus according to the first embodiment.

Next, the following describes a configuration of the image forming apparatus 20. FIG. 4 schematically illustrates the configuration of the image forming apparatus 20. The image forming apparatus 20 is a typical multi-functional peripheral (MFP).

The image forming apparatus 20 includes a control unit 21. The control unit 21 is constituted of, for example, a CPU, a RAM, a ROM, and a dedicated hardware circuit, and manages the whole operation control of the image forming apparatus 20.

The control unit 21 is connected to a document reading unit 22, an image processing unit 23, an image memory 24, an image forming unit 25, an operation unit 26, a facsimile communication unit 27, a network interface unit 28 (a second communication unit), a storage unit 29, and similar unit. The control unit 21 executes an operation control of the above-described connected respective units, and transmits and receives a signal or data to/from the respective units.

The control unit 21 controls driving and processing of a mechanism required for executing an operation control of respective functions, such as a scanner function, a printing function, a copy function, and a facsimile transmission/reception function in response to an execution instruction of a job input by a user via, for example, the operation unit 26 or a PC connected to the network.

The control unit 21 includes the agent unit 21*a*. The agent unit 21*a* is a function block, which is achieved by an execution of a program loaded into the RAM from the ROM or similar memory by the CPU.

The agent unit 21*a* changes a set value of a setting item for own apparatus in accordance with an instruction from the manager unit 11*a* in the management server 10.

A detail process of the agent unit 21*a* is described later.

The document reading unit 22 reads an image from an original document.

The image processing unit 23 executes image processing on image data of the image read by the document reading unit 22 as necessary. For example, the image processing unit 23 executes the image processing, such as shading correction, to improve quality of the image, which has been read by the document reading unit 22, after image formation.

The image memory 24 is an area that temporarily stores data of a document image read and obtained by the document reading unit 22, or temporarily stores the data as a print target by the image forming unit 25.

The image forming unit 25 executes image formation of the image data read by the document reading unit 22 or similar data.

The operation unit 26 includes a touch panel unit and an operation key unit, which accept an instruction regarding various operations and processing executable for the image forming apparatus 20 from the user. The touch panel unit includes a display 26*a*, such as a Liquid Crystal Display (LCD) provided with a touch panel.

The facsimile communication unit 27 includes an encoding/decoding unit, a modulation/demodulation unit, and a Network Control Unit (NCU), which are not illustrated. The facsimile communication unit 27 executes facsimile transmission using a dial-up line network.

The network interface unit 28 is constituted of a communication module, such as a LAN board, and transmits and receives various data to/from a device in a local area (for example, a PC) via a LAN connect to the network interface unit 28 or similar network.

The storage unit 29 stores a document image read by the document reading unit 22, or similar data. The storage unit 29 is a large-capacity storage device, such as an HDD.

The above has described the configuration of the image forming apparatus 20.

Set Value Management Group

Figure 5:
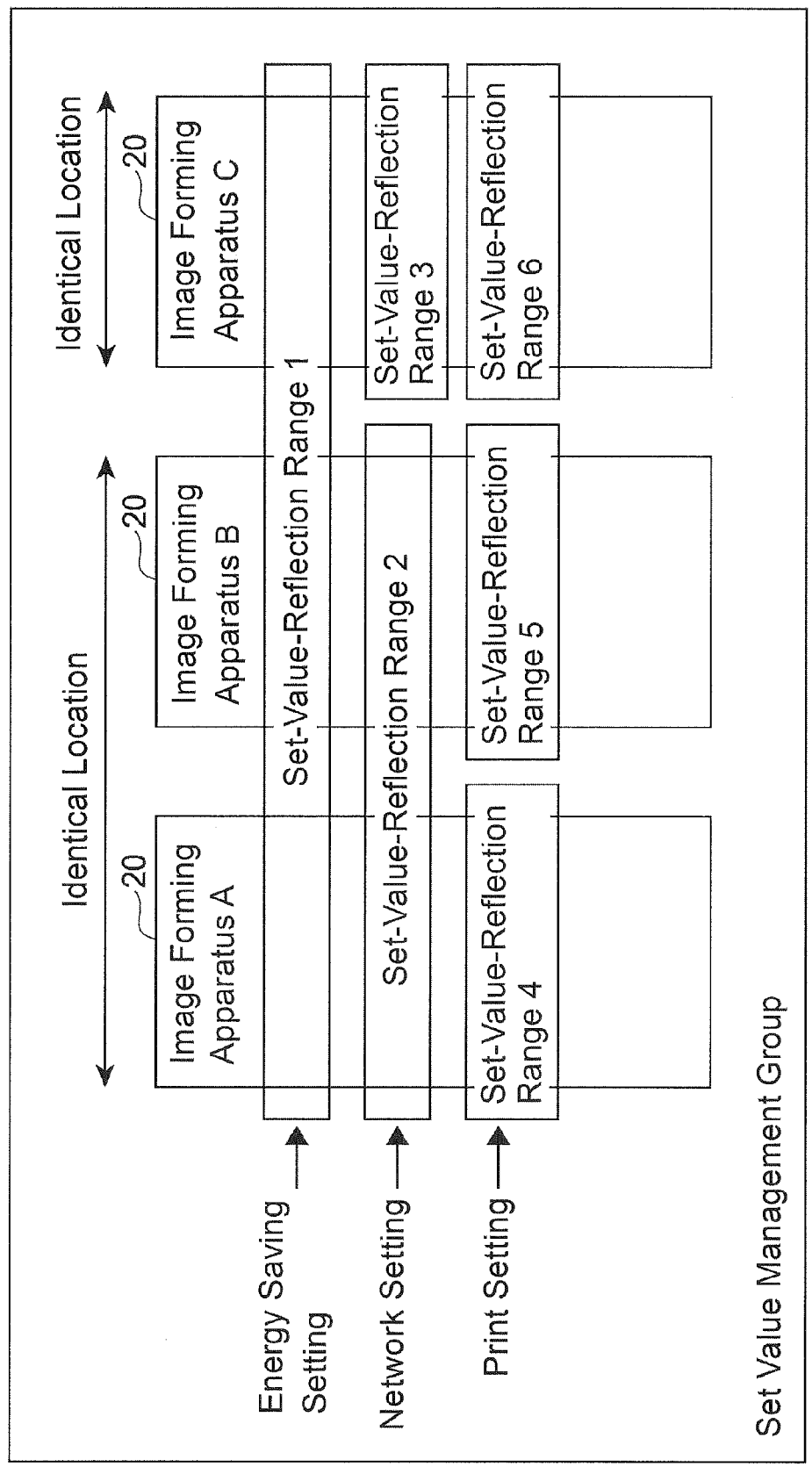
FIG. 5 illustrates an exemplary set value management group according to the first embodiment.

Next, the following describes the above-described set value management group. FIG. 5 illustrates an exemplary set value management group.

In the set value management group illustrated in FIG. 5, the administrator adds three image forming apparatuses 20 (here, referred to as an image forming apparatus A, an image forming apparatus B, and an image forming apparatus C) to the set value management group. Assume that the image forming apparatus A and the image forming apparatus B are installed at an identical location (described below), and the image forming apparatus C is installed at another location.

Then, when a set value for any of the image forming apparatuses in the set value management group is changed for an energy saving setting, which is one of setting item categories (described below), the administrator changes (reflects) set values for all the other image forming apparatuses. Thus, a set-value-reflection range 1 includes all the image forming apparatuses in the set value management group.

A reflection of the net value in an identical location is executed for a network setting, which is one of the setting item categories. Thus, one set-value-reflection range 2 includes the image forming apparatus A and the image forming apparatus B, while one set-value-reflection range 3 includes the image forming apparatus C.

It is preferred that a print setting, which is one of the setting item categories, individually set a set value of a setting item for the image forming apparatus. Thus, a set-value-reflection range 4 includes only the image forming apparatus A, a set-value-reflection range 5 includes only the image forming apparatus B, and a set-value-reflection range 6 includes only the image forming apparatus C.

The reflection-range table 17*b* defines a set-value-reflection range for each setting item category in the set value management group.

The above has described the set value management group.

Reflection-Range Table

Next, the following describes the reflection-range table 17*b*. FIG. 6 illustrates an exemplary reflection-range table 17*b*.

The setting item category is a group of setting items for instructing an action regarding, for example, the printing function of the image forming apparatus 20. As illustrated in FIG. 6, the setting item category includes categories regarding, for example, the print setting, a scanner setting, the energy saving, the network setting, a FAX setting, a security setting, a user setting, and similar setting.

In FIG. 6, a reflection range of a print setting category is "individual apparatus," a reflection range of an energy saving setting category is "all the apparatuses" among the image forming apparatuses in the set value management group, and a reflection range of a network setting category is only the image forming apparatus located at "identical location."

When the "identical location" is defined, a location defined as the identical location may be defined as an location identical to an identical network segment, based on the network setting for the image forming apparatus 20, that is, a setting of, for example, an Internet Protocol (IP) address or a default gateway for the image forming apparatuses 20. Thus, it is possible to determine whether or not the image forming apparatuses 20 are located at the identical location based on at least one piece of unique information and network setting information of the image forming apparatus 20.

The identical location may be defined based on an address of a location, and/or an office name, at which the image forming apparatus 20 is installed. One set value management group may be defined as the identical location. The identical location may be defined such that it is easy for the administrator to manage the image forming apparatus 20.

Thus, this allows the administrator to define a range where the set value change is reflected for each setting item category as a combination. The reflection range as a default value may be defined in the reflection-range table 17*b* to eliminate labor of the definition by the administrator.

This reflection-range table 17*b* is defined for each set value management group.

The above has described the reflection-range table 17*b*.

Process Flow 1

Figure 7:
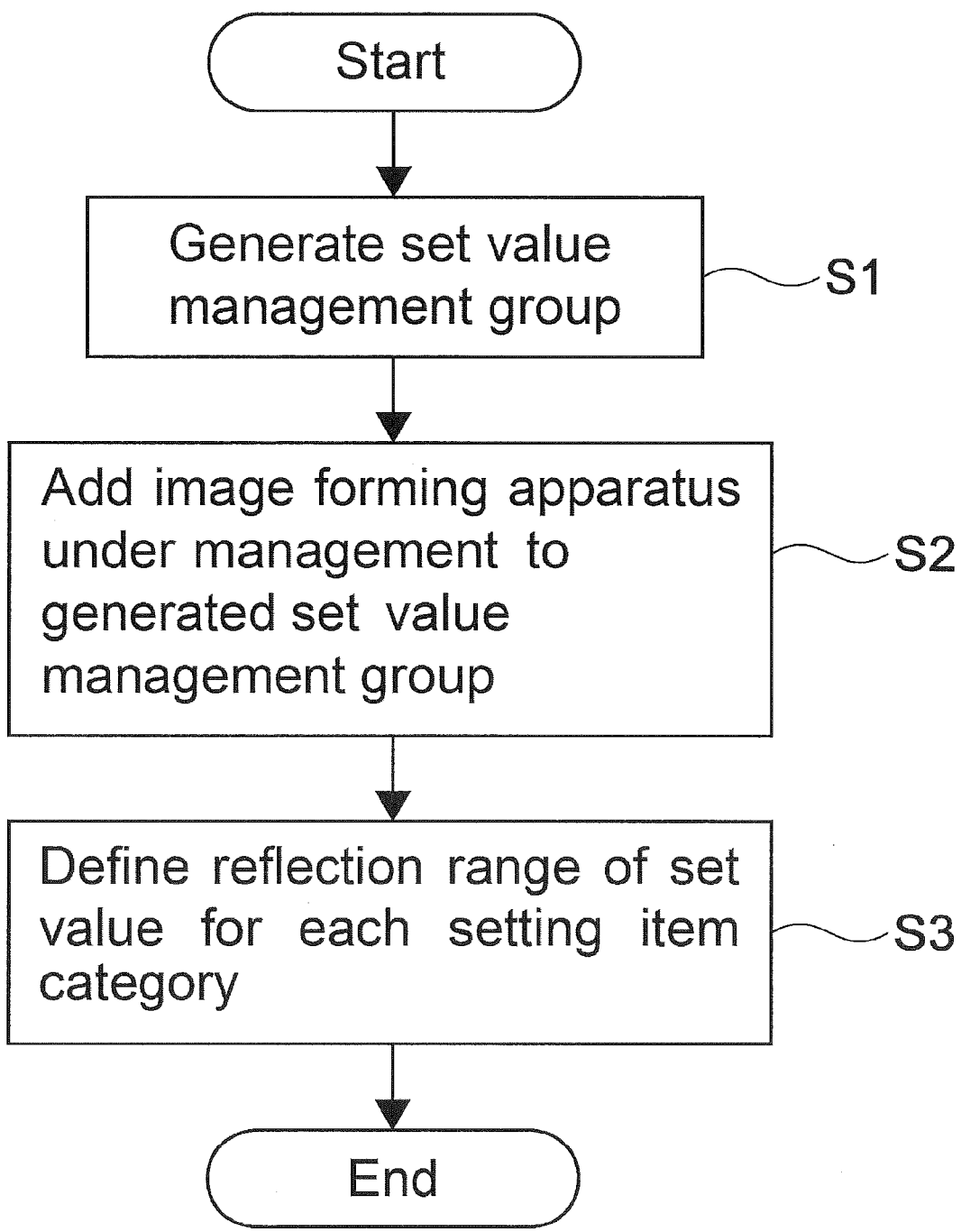
FIG. 7 illustrates a flowchart of a process of the management system according to the first embodiment.

Next, among process flows in the management system 1, the following describes a process regarding generation of a set value management group and a reflection range setting of a set value for each setting item category. FIG. 7 illustrates the process flow regarding the generation of the set value management group and the reflection range setting of the set value for each setting item category.

First, the administrator instructs the manager unit 11a to generate the set value management group (Step S1).

Next, the administrator instructs the manager unit 11a to add the image forming apparatus 20, which the administrator desires to manage as the set value management group generated at Step S1, to the set value management group (Step S2).

Subsequently, the administrator instructs the manager unit 11a to define a reflection range of a set value for each setting item category in the set value management group generated at Step S1 (Step S3).

The above-described processes collects the image forming apparatus 20, which the administrator desires to manage a set value setting for a setting item as one group, into one set value management group, and then a set-value-reflection range for each setting item category in the one set value management group is defined in the reflection-range table 17b.

The above has described that, among the process flows in the management system 1, the process regarding generation of the set value management group and the reflection range setting of the set value for each setting item category.

Process Flow 2

Figure 8:
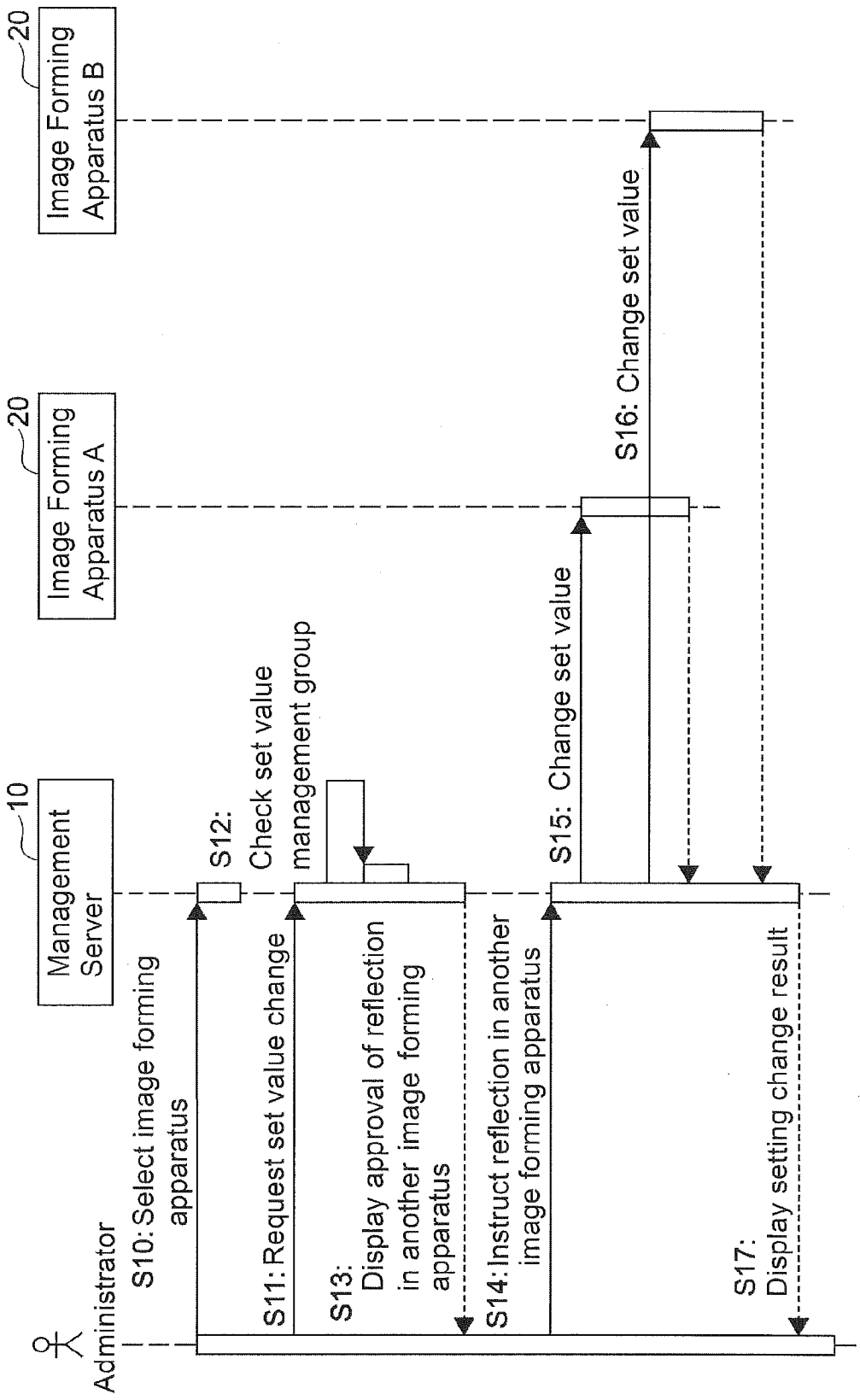
FIG. 8 illustrates a sequential flow of a process of the management system according to the first embodiment.

Next, the following describes that, among the process flows in the management system 1, a process flow where the administrator instructs one image forming apparatus 20 to change a set value, and then reflects the changed set value to another image forming apparatus 20. FIG. 8 illustrates the process flow where the administrator instructs the one image forming apparatus 20 to change the set value, and then reflects the changed set value to another image forming apparatus 20.

First, the administrator selects an image forming apparatus 20 a set value of which the administrator intends to change (Step S10).

Next, the administrator instructs a set value change of a setting item for the selected image forming apparatus 20 (Step S11).

Subsequently, the manager unit 11a checks whether or not the selected image forming apparatus 20 is registered in the set value management group. When the selected image forming apparatus 20 is registered in the set value management group, the manager unit 11a checks which set value management group includes the selected image forming apparatus 20 (Step S12).

When the selected image forming apparatus 20 is registered in the set value management group, the manager unit 11a refers to the reflection-range table 17b of the set value management group registering the image forming apparatus 20, confirms a reflection range of a set value to be changed, and displays a message indicating whether or not a reflection of the set value to another image forming apparatus 20 for the administrator to approve (Step S13).

Then, assume that the administrator has approved the reflection of the set value in the other image forming apparatus 20 (Step S14).

Next, the manager unit 11a instructs the originally selected image forming apparatus 20 to change the set value (Step S15).

Next, the manager unit 11a additionally instructs the image forming apparatus 20, for which the reflection of the set value has been approved, to change the set value (Step S16).

Then, after the manager unit 11a receives a result of the set value change from the image forming apparatus 20, to which the set value change has been instructed, the manager unit 11a displays the received change result for the administrator (Step S17).

The above has described that, among the process flows in the management system 1, the process flow where the administrator instructs the one image forming apparatus 20 to change the set value, and then reflects the changed set value to another image forming apparatus 20.

The above has described the first embodiment.

Second Embodiment

Next, the following describes the second embodiment. The second embodiment is different from the first embodiment in the following points. While the first embodiment executes a reflection of a set value by a trigger of an instruction of a set value change to the one image forming apparatus 20 from the administrator using the terminal 30 for management, the second embodiment executes a reflection of a set value by a trigger of the set value of an image forming apparatus 20 changed by the user of an image forming apparatus 20.

Outline

Figure 9:
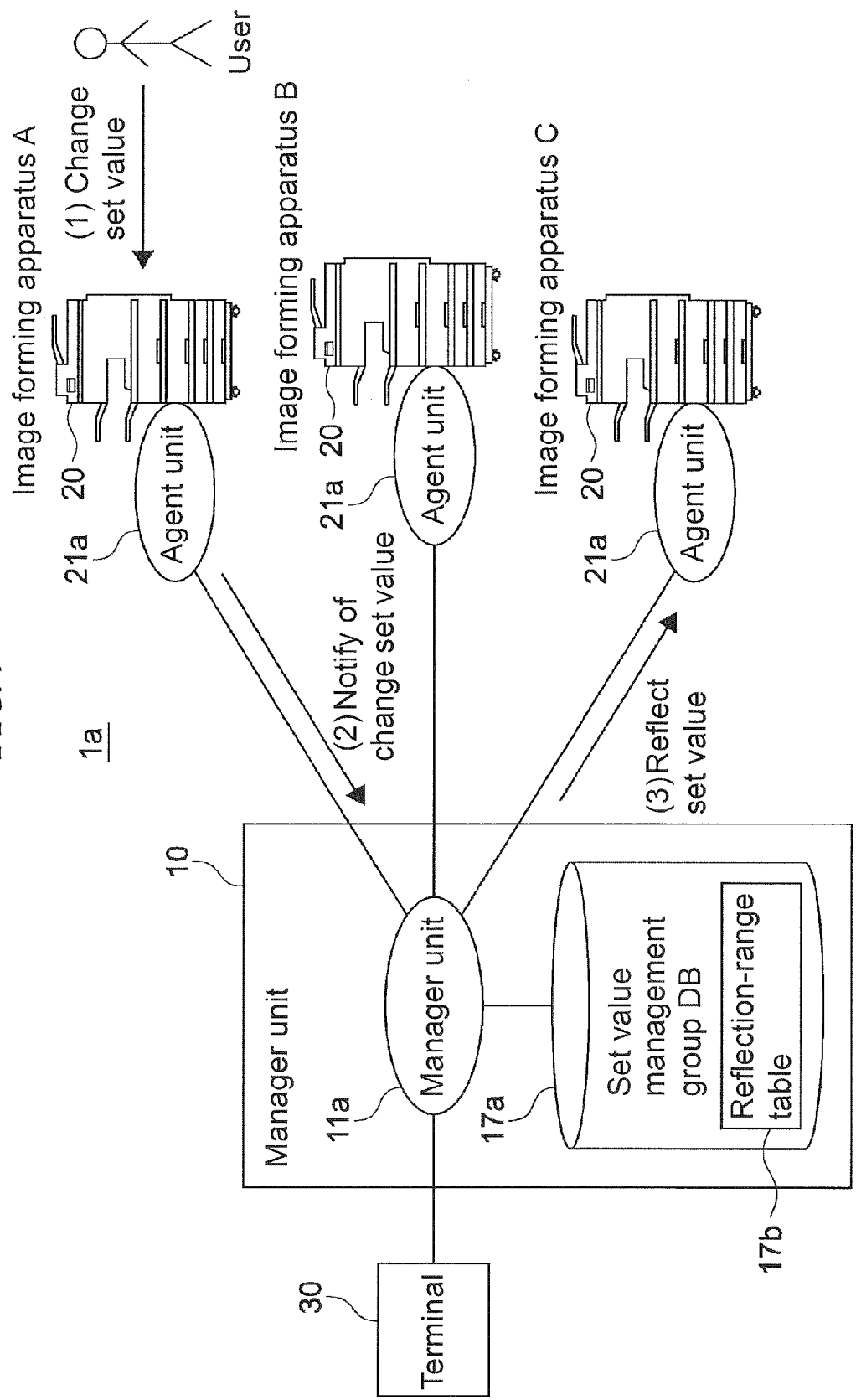
FIG. 9 illustrates a configuration and an operation outline of the management system according to a second embodiment.

First, the following describes an outline of the second embodiment. FIG. 9 illustrates the outline of the second embodiment. The three image forming apparatuses 20 are referred to as an image forming apparatus A, an image forming apparatus B, and an image forming apparatus C in this order from the top.

(1) First, the user changes a set value of a setting item for the image forming apparatus A via, for example, an operation panel of the image forming apparatus A.

(2) Next, the agent unit 21a in the image forming apparatus A detects the change of the set value of the setting item for own apparatus, and then notifies the manager unit 11a of the set value change.

(3) Next, the manager unit 11a determines which image forming apparatus needs the set value change, which has been executed for the image forming apparatus A, to be executed, referring to the reflection-range table 17b. Then the manager unit 11a executes the set value change for the determined image forming apparatus. Here, assume that an image forming apparatus C is determined as an image forming apparatus where a change to the identical set value is to be reflected (without reflecting to the image forming apparatus B).

As described above, with the management system 1a according to the second embodiment of the disclosure, executing a set value change of a setting item for one image forming apparatus 20 by the user automatically determines another image forming apparatus 20 for which an identical change is to be reflected, and then executes the set value change for the determined other image forming apparatus 20.

This ensures the reduced labor of the administrator.

Process Flow

Figure 10:
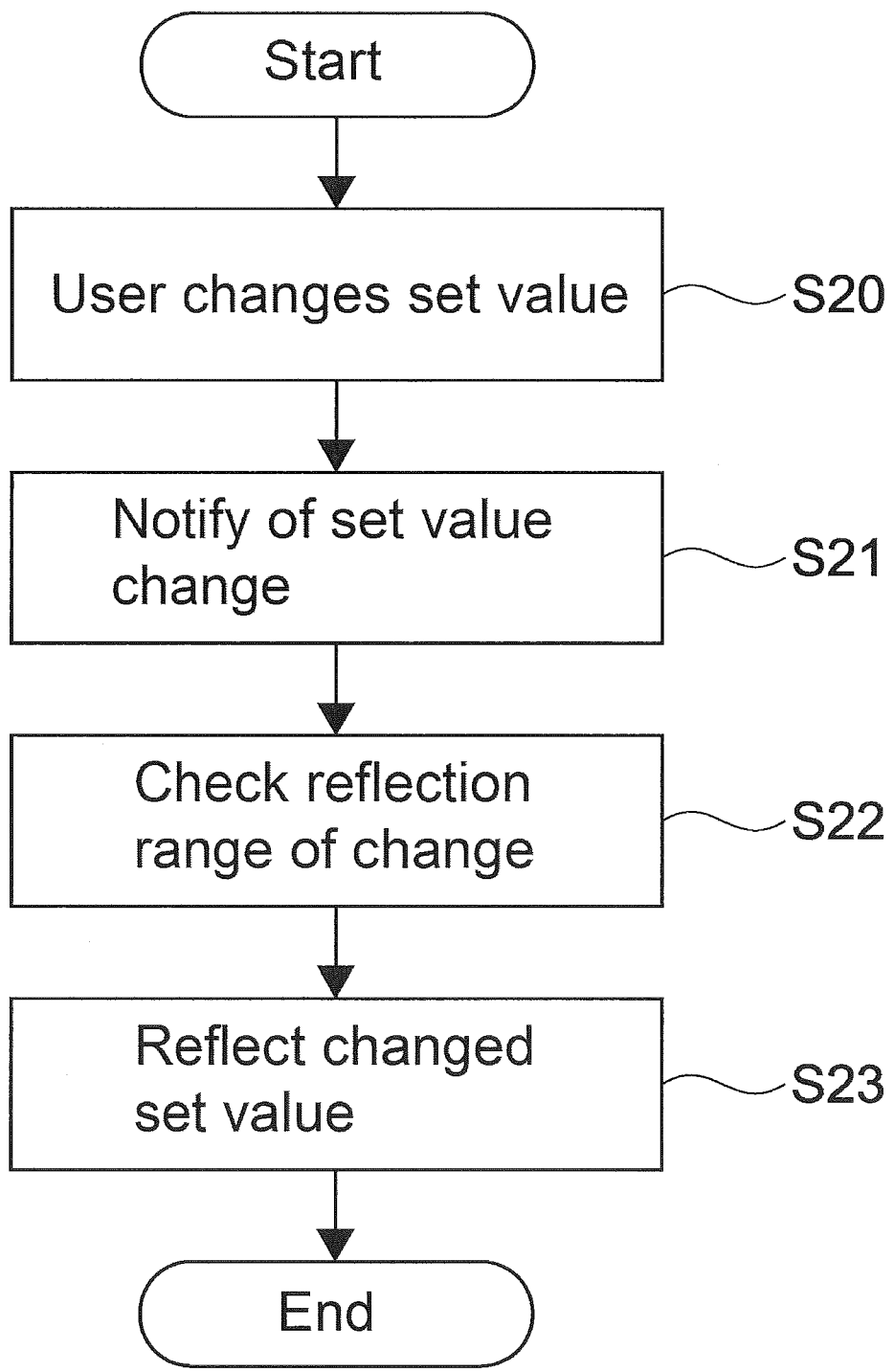
FIG. 10 illustrates a flowchart of a process of a management system according to the second embodiment.

Next, the following describes a process flow of the management system 1a according to the second embodiment. FIG. 10 illustrates the process flow of the management system 1a according to the second embodiment.

First, the user changes a set value of one image forming apparatus 20 (Step S20).

Next, the agent unit 21a in the image forming apparatus 20 where the set value is changed notifies the manager unit 11a of the set value change (Step S21).

Next, the manager unit 11a refers to the reflection-range table 17b of the set value management group that includes the image forming apparatus 20 with the changed set value, so as to check a reflection range of the changed set value (Step S22).

Subsequently, the manager unit 11a instructs the image forming apparatus 20, for which a set value needs to be changed, to change the set value based on the checked change reflection range (Step S23).

The above has described the process flow in the management system 1a according to the second embodiment.

The above been described the second embodiment. Thus, the respective embodiments ensure the efficient management of the image forming apparatuses as management targets in units of groups.

SUPPLEMENTARY NOTES

The management system 1 of the disclosure includes the management server 10 and one or more image forming apparatuses 20. The management server 10 includes the operation input unit 14, the display 16, the first communication unit 15, the set value management group database 17a, the reflection-range table 17b, and the manager unit 11a. The operation input unit 14 accepts an instruction from an administrator who manages the one or more image forming apparatuses 20. The display 16 displays various information for the administrator. The first communication unit 15 ensures communication with the one or more image forming apparatuses 20. The set value management group database 17a includes defined set value management groups for managing set value changes of setting items for the one or more image forming apparatuses 20. The reflection-range table 17b is generated for each set value management group, and defines which image forming apparatus 20 in the set value management group reflects the set value change of a specific one of the image forming apparatuses 20. When the administrator instructs a set value change of a setting item for the specific image forming apparatus 20, the manager unit 11a determines which set value management group includes the image forming apparatus 20 to which the change has been instructed, refers to the reflection-range table 17b of the set value management group including the image forming apparatus 20 to which the change has been instructed, determines another image forming apparatus 20 for which the manager unit 11a executes the set value change based on the reference result, and then instructs the other determined image forming apparatus 20 to change the set value. The image forming apparatuses 20 each include the second communication unit 28 and the agent unit 21a. The second communication unit 28 ensures communication with the management server 10. When the agent unit 21a receives an instruction of a set value change of a setting item for own apparatus from the manager unit 11a, the agent unit 21a executes the set value change of the setting item for the own apparatus based on the received instruction.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A management system comprising:
a management server connected to a network; and one or more image forming apparatuses connected to the network, wherein
the management server includes a Central Processing Unit (CPU), and a storage unit as at least one of a Hard Disk Drive (HDD) and a flash memory,
  the storage unit stores: (i) a set value management group database that includes a set value management group for managing a set value change of a setting item for the one or more image forming apparatuses; and (ii) a reflection-range table that defines a reflection range of which image forming apparatus in the set value management group reflects the set value change executed to a specific image forming apparatus for the set value management group, and
  the CPU, when an administrator instructs the set value change of the setting item for the specific image forming apparatus, (i) determines which set value management group includes the specific image forming apparatus to which the set value change has been instructed, (ii) refers to the reflection-range table of the set value management group including the specific image forming apparatus to which the set value change has been instructed, (iii) determines which image forming apparatus other than the specific image forming apparatus executes the set value change based on the referred reflection-range table, and (iv) instructs the determined image forming apparatus other than the specific image forming apparatus to change the set value,
wherein the determined image forming apparatuses, when receiving an instruction of the set value change of the setting item for own apparatus from the management server via the network, executes the set value change of the setting item for the own apparatus based on the received instruction,
wherein the set value management group includes an identical location that is determined by at least one of a network setting of the image forming apparatus, an address of a location at which the image forming apparatus is installed, and an office name at which the image forming apparatus is installed,
wherein the reflection-range table includes a combination of a setting item category and the reflection range of the set value change in the set value management group, and
wherein the reflection range includes one of (i) all image forming apparatuses in the set value management group, (ii) one or more image forming apparatuses in the identical location in the set value management group; and (iii) an individual image forming apparatus in the set value management group.

2. The management system according to claim 1, wherein the setting item category includes at least one of a print setting category, a scanner setting category, an energy saving setting category, a network setting category, a FAX setting category, a security setting category, and user setting category.

3. A management system comprising:
a management server connected to a network; and one or more image forming apparatuses connected to the network,
wherein a specific image forming apparatuses, when receiving an instruction of a set value change of a setting item for own apparatus from a user of the own apparatus, (i) executes the set value change of the setting item for the own apparatus based on the received instruction, and (ii) notifies the management server of the set value change of the setting item for the specific image forming apparatus, wherein the management server includes a Central Processing Unit (CPU), and a storage unit as at least one of a Hard Disk Drive (HDD) and a flash memory, the storage unit that stores: (i) a set value management group database that includes a set value management group for managing a set value change of a setting item for the one or more image forming apparatuses; and (ii) a reflection-range table that defines a reflection range of which image forming apparatus in the set value management group reflects the set value change executed to a specific image forming apparatus for the set value management group, and the CPU, when being notified of the set value change from the specific image forming apparatus, (i) determines which set value management group includes the specific image forming apparatus that has notified the set value change, (ii) refers to the reflection-range table of the set value management group including the specific image forming apparatus that has notified the set value change, (iii) determines which image forming apparatus other than the specific image forming apparatus executes the set value change based on the referred reflection-range table, and (iv) instructs the determined image forming apparatus other than the specific image forming apparatus to change the set value, wherein the determined image forming apparatuses, when receiving an instruction of the set value change of the setting item for own apparatus from the management server via the network, executes the set value change of the setting item for the own apparatus based on the received instruction, wherein the set value management group includes an identical location that is determined by at least one of a network setting of the image forming apparatus, an address of a location at which the image forming apparatus is installed, and an office name at which the image forming apparatus is installed, wherein the reflection-range table includes a combination of a setting item category and the reflection range of the set value change in the set value management group, and wherein the reflection range includes one of (i) all image forming apparatuses in the set value management group, (ii) one or more image forming apparatuses in the identical location in the set value management group; and (iii) an individual image forming apparatus in the set value management group.

4. The management system according to claim 3, wherein the setting item category includes at least one of a print setting category, a scanner setting category, an energy saving setting category, a network setting category, a FAX setting category, a security setting category, and user setting category.

* * * * *